G. S. MEYER.
REMOVABLE CALK.
APPLICATION FILED DEC. 14, 1908.
934,197.
Patented Sept. 14, 1909.
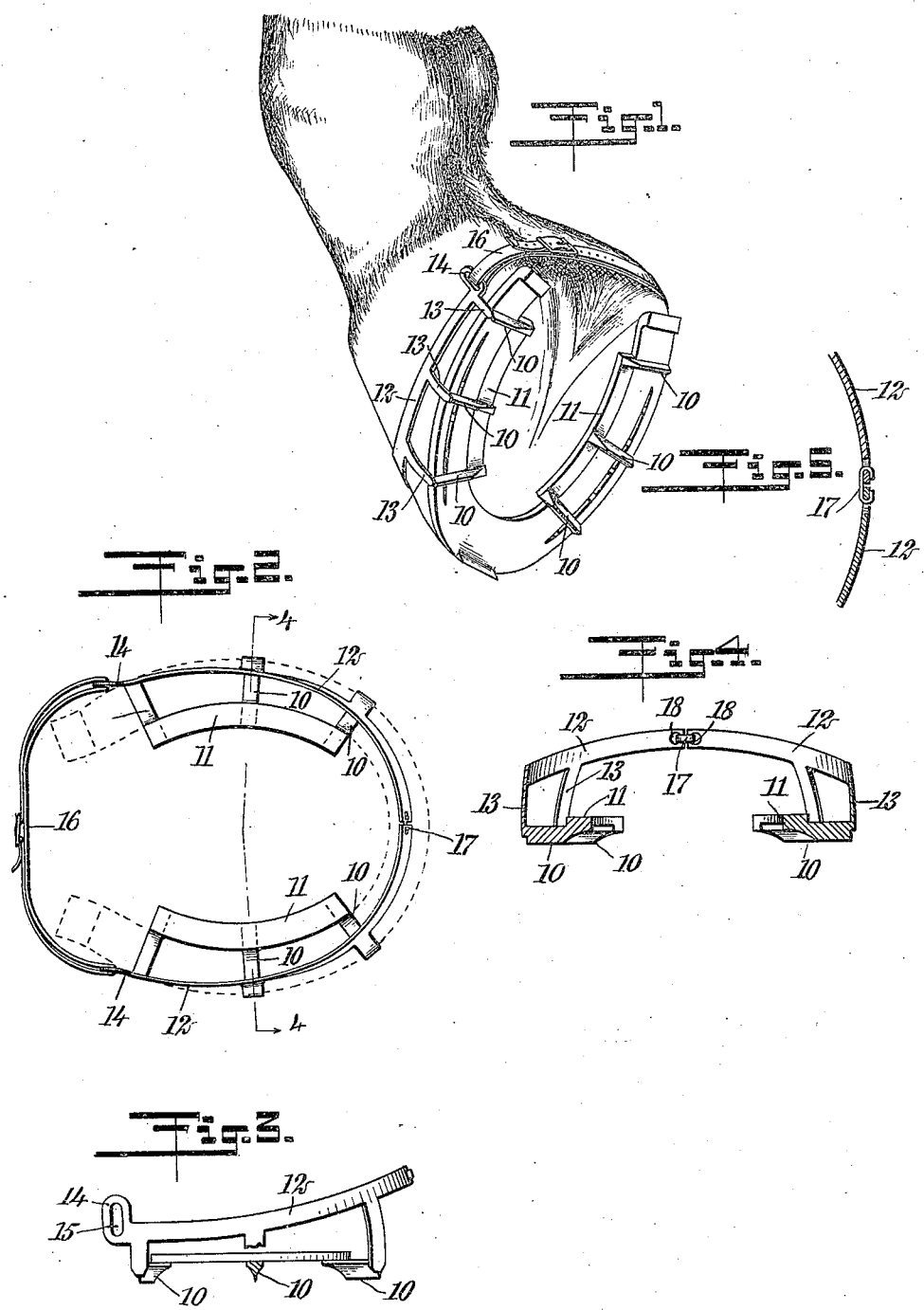
WITNESSES
F. J. Hackenburg.
C. W. Fairbanks
INVENTOR
George S. Meyer
BY Munn & Co.
ATTORNEYS

UNITED STATES PATENT OFFICE.

GEORGE S. MEYER, OF NEWBURGH, NEW YORK.

REMOVABLE CALK.

934,197.  Specification of Letters Patent.   Patented Sept. 14, 1909.

Application filed December 14, 1908.  Serial No. 467,377.

*To all whom it may concern:*

Be it known that I, GEORGE S. MEYER, a citizen of the United States, and a resident of Newburgh, in the county of Orange and State of New York, have invented a new and Improved Removable Calk, of which the following is a full, clear, and exact description.

This invention relates to certain improvements in removable calks for horseshoes, and more particularly to that type of calk disclosed in my previous patent, Number 892282, granted June 30, 1908.

The principal object of the invention is to connect the calks which extend transversely of the under side of the shoe more firmly to the outer member which encircles the hoof, and to provide for the relative movement of the opposite halves of both the inner and outer connecting members.

Reference is to be had to the accompanying drawings, forming a part of this specification, in which similar characters of reference indicate corresponding parts in all the figures, and in which—

Figure 1 is a perspective view of a horse's foot provided with my improved removable calk; Fig. 2 is a top plan view of the calk removed, the horseshoe being shown in dotted lines; Fig. 3 is a side elevation of one-half or section of the calk, a portion thereof being broken away; Fig. 4 is a transverse section on the line 4—4 of Fig. 2; and Fig. 5 is a detail showing in section, the connections between the opposite halves or portions of the calk.

In my previous patent above referred to, I have illustrated a plurality of calks extending transversely of the under side of the shoe, and secured together at their outer ends by a wire and connected together at their inner ends by a separate wire. In my present construction I employ the same general combination of parts, but the calks are preferably formed of two separate sections or halves having relative movement to better adapt them to fit the hoof of the horse.

In the specific form illustrated the device is formed of two separate sections or halves hinged or pivotally connected together in front and adjustably secured together by a strap at the back. Each section or half includes a plurality of calks proper 10, in the form of bars substantially triangular in cross section and extending transversely of the shoe at the under surface thereof. These bars are of a length slightly greater than the width of the adjacent portion of the shoe, and all are connected together at their inner ends by a connecting bar 11. This bar is preferably formed integral with the calks, and the plane of its under surface is coincident with the plane of the under surface of the shoe and the plane of the upper surface of the calks proper. The bar 11 lies closely adjacent the inner surface of the shoe and also adjacent the under surface of the hoof, although it is preferably spaced a short distance from the latter. The bar 11 of each half connects together all of the calks of that half and terminates adjacent the rear end of the shoe and adjacent the front portion of the shoe. Each bar is curved in accordance with the size of the shoe and at its front end may be connected, if desired, to the other bar by any suitable form of hinge or pivot, but preferably the two bars 11 are separate and disconnected as illustrated.

The outer connecting member of each half or section is formed of a metal band 12, curved to engage with the outer surface of the hoof a short distance above the lower surface of the latter, and this band has formed integral therewith depending flanges or links 13 corresponding in position to the calks 10. The links may also be formed integral with the calks or they may be formed separate therefrom and rigidly secured thereto. Each of the two members 12 has an enlarged rear end 14 provided with an aperture 15 therein, and a leather strap 16 is preferably employed for connecting together the rear ends of the two members 12, and at the same time the calk is secured in place. The front ends of the two members 12 are connected by any suitable form of hinge or pivotal connection, so as to permit the two sections or halves of the device to be moved relatively to each other. As shown, I employ a link 17 extending through apertures 18 in the front ends of the members 12 and having its ends bent to form two separate hooks.

Having thus described my invention, I claim as new and desire to secure by Letters Patent:

1. A removable calk for horseshoes, comprising a plurality of calks proper extending transversely of the shoe at the under side thereof and spaced apart, an outer connecting member adjacent the outer surface of the hoof above the plane of the lower surface thereof and formed of two sections or halves pivotally connected together at the front, and a flexible member connecting said sections or halves at the rear of the hoof, and an inner connecting member beneath the hoof and adjacent the shoe and extending above the plane of the lower surface of the shoe, said inner connecting member being formed of two separate members or halves separated from each other and each secured to the calks on its respective side of the shoe.

2. A removable calk for horseshoes, comprising a plurality of calks proper extending transversely of the shoe at the under side thereof and each presenting a transversely-extending cutting edge, a band disposed adjacent the outer surface of the hoof above the plane of the lower surface thereof and formed of two separate sections pivotally connected together at the front, downwardly-extending links integral with said band and said calks, an inner connecting member beneath the hoof and adjacent the edge of the shoe and above the lower surface of the latter, said inner connecting member being formed of two separate sections or halves separated from each other and each integral with the calks on its respective side of the shoe, and flexible and adjustable connecting means in engagement with the rear end of said band sections above the plane of the shoe.

In testimony whereof I have signed my name to this specification in the presence of two subscribing witnesses.

GEORGE S. MEYER.

Witnesses:
 CLAIR W. FAIRBANK,
 JOHN P. DAVIS.